United States Patent
Fukuda et al.

(10) Patent No.: US 9,813,847 B2
(45) Date of Patent: Nov. 7, 2017

(54) COMMUNICATION SYSTEM AND CONTROL APPARATUS

(71) Applicant: Panasonic Intellectual Property Management Co., Ltd., Osaka (JP)

(72) Inventors: Naohiro Fukuda, Chiba (JP); Kenji Yasu, Osaka (JP); Yoichi Masuda, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/317,344

(22) PCT Filed: May 20, 2015

(86) PCT No.: PCT/JP2015/002545
§ 371 (c)(1),
(2) Date: Dec. 8, 2016

(87) PCT Pub. No.: WO2015/190040
PCT Pub. Date: Dec. 17, 2015

(65) Prior Publication Data
US 2017/0118585 A1   Apr. 27, 2017

(30) Foreign Application Priority Data
Jun. 13, 2014   (JP) .................. 2014-122585

(51) Int. Cl.
*H04B 5/00* (2006.01)
*H04W 4/00* (2009.01)
(Continued)

(52) U.S. Cl.
CPC ............ *H04W 4/008* (2013.01); *G06F 3/023* (2013.01); *G06F 3/147* (2013.01); *H04W 76/021* (2013.01)

(58) Field of Classification Search
None
See application file for complete search history.

(56) References Cited

U.S. PATENT DOCUMENTS

| | | | |
|---|---|---|---|
| 2002/0095588 A1* | 7/2002 | Shigematsu | G06Q 20/367 713/186 |
| 2004/0076300 A1 | 4/2004 | Ishidoshiro | |

(Continued)

FOREIGN PATENT DOCUMENTS

| | | |
|---|---|---|
| JP | 2004-215232 | 7/2004 |
| JP | 2005-182145 | 7/2005 |

(Continued)

OTHER PUBLICATIONS

International Search Report and Written Opinion for corresponding International Application No. PCT/JP2015/002545 dated Jun. 30, 2015.

*Primary Examiner* — Mohammed Rachedine
(74) *Attorney, Agent, or Firm* — Renner Otto Boisselle & Sklar, LLP

(57) ABSTRACT

In a communication system including: a control apparatus which controls pairing for communication according to kinds of pairing methods; and devices each of which performs pairing for communication according to one or more predetermined kinds of pairing methods, and performs encryption communication with the control apparatus by pairing with the control apparatus, wherein the control apparatus includes: a kind obtaining unit which obtains, from each device, the predetermined kinds of pairing methods for the device; a combination determining unit which determines, for each device, a combination of a same kind of pairing methods included in both the plurality of kinds of pairing methods for the control apparatus and the predetermined kinds of pairing methods obtained by the kind obtaining unit; and a display unit which displays, to a user, the (Continued)

combination of the same kind of pairing methods determined by the combination determining unit according to a predetermined condition.

10 Claims, 9 Drawing Sheets

(51) Int. Cl.
    *G06F 3/023*     (2006.01)
    *G06F 3/147*     (2006.01)
    *H04W 76/02*     (2009.01)

(56)     References Cited

U.S. PATENT DOCUMENTS

| | | |
|---|---|---|
| 2005/0201557 A1 | 9/2005 | Ishidoshiro |
| 2008/0076389 A1* | 3/2008 | Lee .................. H04L 63/0492 |
| | | 455/411 |
| 2009/0240814 A1* | 9/2009 | Brubacher ............ H04W 12/04 |
| | | 709/227 |
| 2009/0270036 A1* | 10/2009 | Michaud ............... H04W 12/06 |
| | | 455/41.3 |
| 2010/0115146 A1* | 5/2010 | Roth .................... G06F 9/4413 |
| | | 710/11 |

FOREIGN PATENT DOCUMENTS

| | | |
|---|---|---|
| JP | 2010-507282 A | 3/2010 |
| WO | WO 2008/048809 A2 | 4/2008 |

\* cited by examiner

COMMUNICATION SYSTEM AND CONTROL APPARATUS

TECHNICAL FIELD

The present invention relates to a communication system and a control apparatus which perform pairing with a plurality of devices.

BACKGROUND ART

Various kinds of methods for pairing between communication devices have been proposed. Examples of the methods include a method using a personal identification number (PIN), push-button methods (see Patent Literatures 1 and 2), and a near field wireless communication method (see Patent Literature 3). Each communication device shares a secret key with a target by pairing with the target. Each communication device may be configured to be capable of pairing according to a plurality of kinds of pairing methods.

CITATION LIST

Patent Literature

PTL 1: Japanese Unexamined Patent Application Publication No. 2004-215232
PTL 2: Japanese Unexamined Patent Application Publication No. 2010-507282
PTL 3: Japanese Unexamined Patent Application Publication No. 2005-182145

SUMMARY OF THE INVENTION

Technical Problem

When the number of communication devices increases and pairing methods which can be performed by the devices are different, complicated operations and processes are required in the pairing.

The present invention was made in view of the aforementioned problem, and has an object to provide a communication system and a control apparatus for increasing the userfriendliness in the pairing with the plurality of devices.

Solution to Problem

In order to achieve the object, a communication system according to a first aspect of the present invention includes: a control apparatus which controls pairing for communication according to a plurality of kinds of pairing methods; and a plurality of devices each of which performs pairing for communication according to one or more predetermined kinds of pairing methods, and performs encryption communication with the control apparatus by pairing with the control apparatus, wherein the control apparatus includes: a kind obtaining unit configured to obtain, from each of the plurality of devices, the one or more predetermined kinds of pairing methods for the device; a combination determining unit configured to determine, for each of the plurality of devices, a combination of a same kind of pairing methods included in both the plurality of kinds of pairing methods for the control apparatus and the one or more predetermined kinds of pairing methods obtained by the kind obtaining unit; and a display unit configured to display, to a user, the combination of the same kind of pairing methods determined by the combination determining unit, for each of the plurality of devices according to a predetermined condition.

A control apparatus according to a second aspect of the present invention controls pairing for communication according to a plurality of kinds of pairing methods, and controls encryption communication with a plurality of devices by pairing with the plurality of devices, each of the plurality of devices performing pairing for communication according to one or more predetermined kinds of pairing methods, the control apparatus including: a kind obtaining unit configured to obtain, from each of the plurality of devices, the one or more predetermined kinds of pairing methods for the device; a combination determining unit configured to determine, for each of the plurality of devices, a combination of a same kind of pairing methods included in both the plurality of kinds of pairing methods for the control apparatus and the one or more predetermined kinds of pairing methods obtained by the kind obtaining unit; and display unit configured to display, to a user, the combination of the same kind of pairing methods determined by the combination determining unit, for each of the plurality of devices according to a predetermined condition.

Advantageous Effects of Invention

According to the present invention, it is possible to provide the communication system and the control apparatus for increasing the userfriendliness in the pairing with the plurality of devices with consideration of the combinations of the kinds of pairing methods.

DESCRIPTION OF EXEMPLARY EMBODIMENTS

Next, an embodiment of the present invention is described with reference to the drawings. In the following descriptions regarding the drawings, the same or similar parts are assigned with the same or similar reference signs, and overlapping descriptions are omitted.

Communication System

Figure 1:
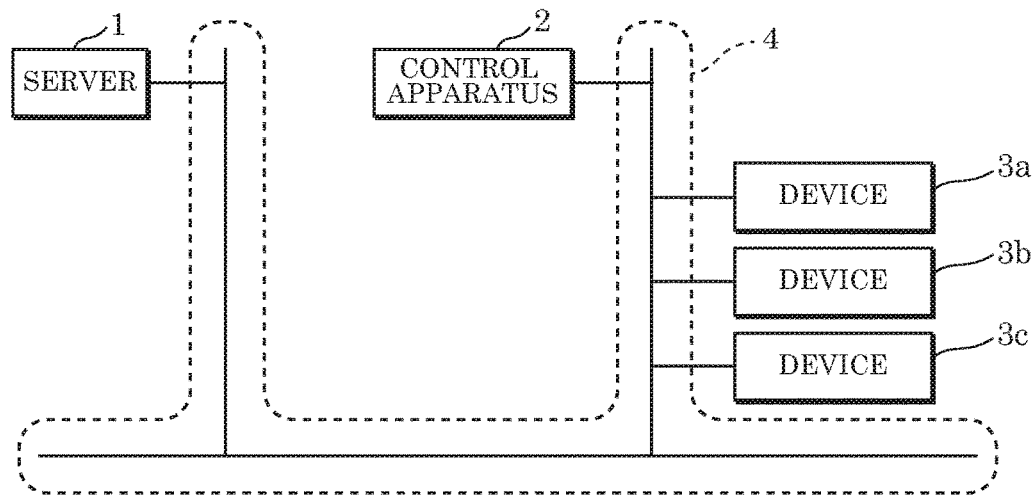
FIG. 1 is a schematic block diagram for illustrating a basic configuration of a communication system according to an embodiment of the present invention.

As illustrated in FIG. 1, a communication system according to the embodiment of the present invention includes: server 1; control apparatus 2; a plurality of devices 3a to 3c; and communication line 4 which connects server 1, control apparatus 2, and the plurality of devices 3a to 3c in such a manner that they can be communicated with each other. Each of control apparatus 2 and the plurality of devices 3a to 3c has a pre-programmed function for pairing for communication with other devices according to predetermined pairing methods. In particular, control apparatus 2 has a function for pairing according to a plurality of pairing methods. The number of the plurality of devices 3a to 3c is 3 in the example illustrated in FIG. 1, but may be 2, or 4 or more. It is to be noted that server 1 is not essential in the system configuration.

Control apparatus 2 is, for example, a controller in a home energy management system (HEMS) which manages the amount of electricity used by the plurality of devices 3a to 3c, the amount of electricity which has been generated excessively, and the like. In this case, the plurality of devices 3a to 3c are respectively configured with power source devices such as an air conditioner, a refrigerator, a household electrical appliance, a solar battery, a storage battery, etc. Other than that, the plurality of devices 3a to 3c may be respectively configured with a smart meter, an electric vehicle (EV), a plug-in-hybrid car (PHV), a water heater, etc.

For example, server 1 is capable of communicating with control apparatus 2 via the Internet, and may store or analyze information managed by control apparatus 2. Communication line 4 may be configured with a plurality of kinds of communication lines such as a cable and a wireless medium.

Figure 2:
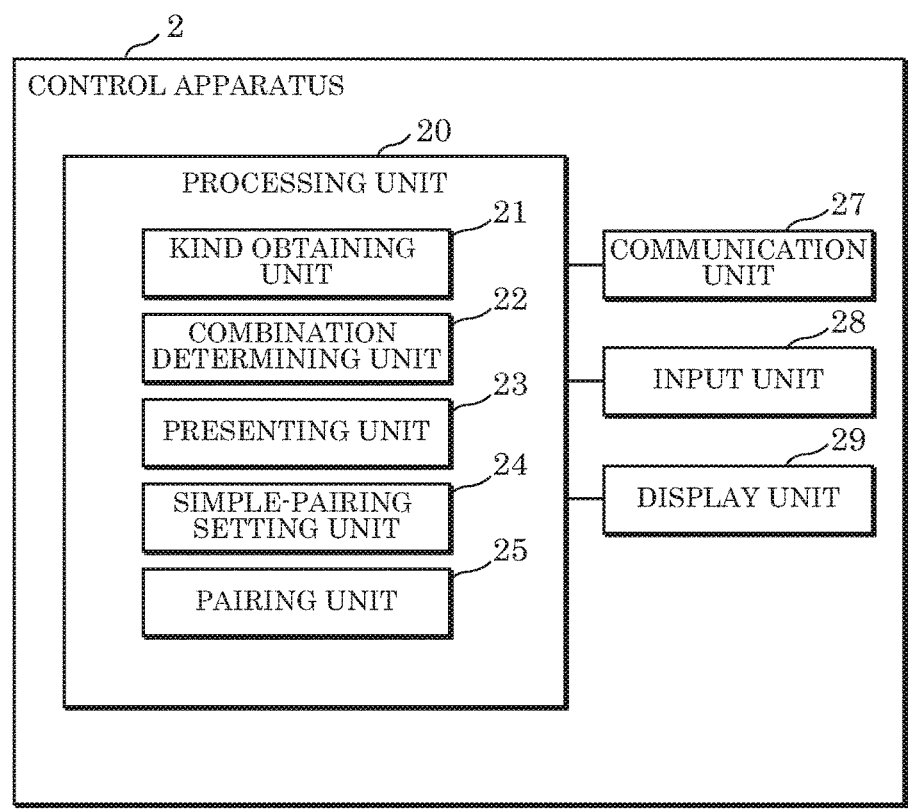
FIG. 2 is a block diagram for illustrating a basic configuration of a control apparatus included in the communication system according to the embodiment of the present invention.

As illustrated in FIG. 2, control apparatus 2 includes: processing unit 20; communication unit 27 which communicates with other devices under control by processing unit 20; input unit 28 which receives user operations; and display unit 29 which displays information to a user. Communication unit 27 may perform wireless communication or wired communication. For example, input unit 28 is configured with an input device such as push buttons, a pointing device, and the like, and allows signals according to user operations to be input to processing unit 20. Display unit 29 is configured with, for example, a display device such as a liquid crystal display. Input unit 28 and display unit 29 may be formed integrally as a touch panel display. Alternatively, display unit 29 may be provided as a body separate from control apparatus 2.

Processing unit 20 includes, as logical structures, the following: kind obtaining unit 21; combination determining unit 22; presenting unit 23;

simple-pairing setting unit 24; and pairing unit 25. Processing unit 20 is configured with, for example, operation processing device such as a microcomputer. Processing unit 20 includes a storage device which stores a program or each data.

Kind obtaining unit 21 obtains the kinds of pairing methods performed by the plurality of devices 3a to 3c by asking the plurality of devices 3a to 3c about the kinds of pairing methods that the plurality of devices 3a to 3c can perform via communication unit 27.

Combination determining unit 22 determines the combination of the same kind of pairing methods, based on the kinds of pairing methods for the plurality of devices 3a to 3c obtained by kind obtaining unit 21 and the kinds of pairing methods for control apparatus 2.

Presenting unit 23 causes display unit 29 to display various kinds of information to the user. Presenting unit 23 controls display unit 29 so that display unit 29 displays the combination of the kind of pairing methods determined by combination determining unit 22 to the user, for each of the plurality of devices 3a to 3c according to predetermined conditions.

Regarding the combination of the kind of pairing methods displayed by display unit 29, simple-pairing setting unit 24 sets a simple pairing process in the pairing with devices 3a to 3c for each of the kinds of pairing methods.

Pairing unit 25 shares a secret key (secret information) with each of devices 3a to 3c by communicating with the plurality of devices 3a to 3c via communication unit 27 and pairing with each of devices 3a to 3c according to a predetermined pairing method. Control apparatus 2 performs encryption communication with the plurality of devices 3a to 3c using the secret key shared by pairing unit 25.

Figure 3:
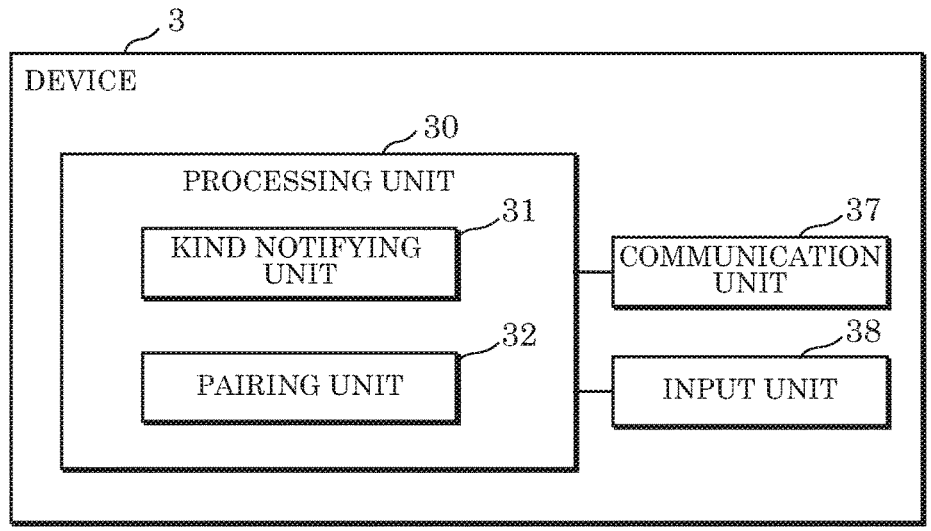
FIG. 3 is a block diagram for illustrating a basic configuration of a device included in the communication system according to the embodiment of the present invention.

As illustrated in FIG. 3, each of the plurality of devices 3a to 3c (which may be simply referred to as "devices 3" when they are collectively referred to hereinafter) includes processing unit 30, communication unit 37, and input unit 38. Communication unit 37 may perform wireless communication or wired communication. For example, input unit 28 is configured with an input device such as push buttons and the like, and allows signals according to user operations to be input to processing unit 30.

Processing unit 30 includes kind notifying unit 31 and pairing unit 32 as logical structures. Processing unit 30 is configured with, for example, operation processing device such as a microcomputer. Processing unit 30 includes a storage device which stores a program or each data.

Kind notifying unit 31 notifies the kind of each of at least one pairing method which has been pre-programmed in each of devices 3 via communication unit 37, in response to the inquiry from control apparatus 2. Pairing unit 32 shares a secret key (secret information) with control apparatus 2 by communicating with control apparatus 2 via communication unit 37 and pairing with control apparatus 2 according to the predetermined pairing method. Each of the plurality of devices 3a to 3c performs encryption communication with control apparatus 2 using the secret key shared by pairing unit 32.

—Operations Performed by Control Apparatus 2—

Figure 4:
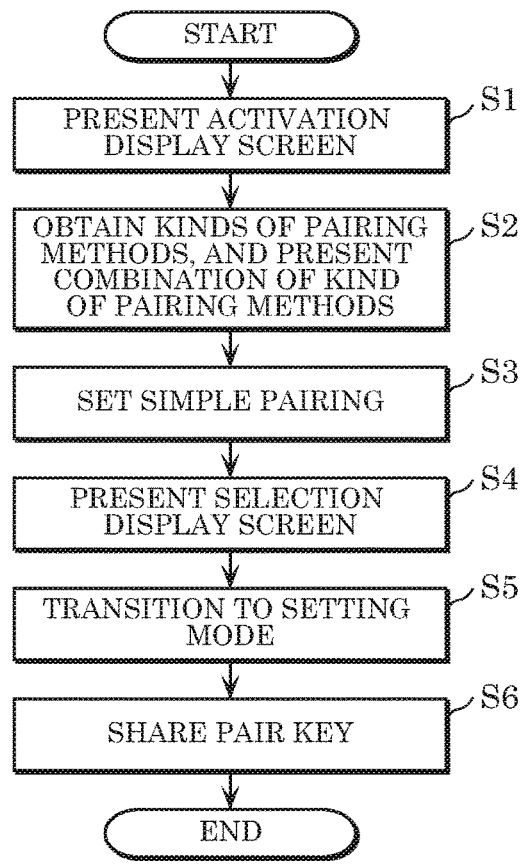
FIG. 4 is a flowchart for illustrating operations performed by the control apparatus included in the communication system according to the embodiment of the present invention.

Exemplary operations performed by control apparatus 2 are described with reference to the flowchart in FIG. 4.

First, in Step S1, processing unit 30 executes a setting support program for supporting pairing with the plurality of devices 3a to 3c, in response to an operation instructing the start of pairing with the plurality of devices 3a to 3c made by the user to input unit 28. In the execution of a presentation program, presenting unit 23 presents, to display unit 29, an activation display screen including, for example, characters such as "in search" or "Please wait for a while."

In Step S2, kind obtaining unit 21 obtains, from the plurality of devices 3a to 3c, the kinds of pairing methods for the plurality of devices 3a to 3c by sequentially asking the plurality of devices 3a to 3c about the kinds of pairing methods which have been pre-programmed in the plurality of devices 3a to 3c. Combination determining unit 22 determines the combination of the same kind of pairing methods, based on the kinds of the respective pairing methods obtained by kind obtaining unit 21 and the kinds of pairing methods for control apparatus 2. Presenting unit 23 presents, to the user by means of display unit 29, the combination of the kind of pairing methods determined by combination determining unit 22, for each of the plurality of devices 3a to 3c according to the predetermined conditions.

In Step S3, simple-pairing setting unit 24 sets simple-pairing with the plurality of devices 3a to 3c by causing one of the processes to be shared for each of the kinds of pairing methods which have been presented.

In Step S4, presenting unit 23 presents the kinds of pairing methods to the user by means of display unit 29, so that the user can select, via input unit 28, any one of the kinds of pairing methods presented in Step S2. Input unit 28 allows a signal for identifying the kind of pairing method to be input to processing unit 20, according to the user operation for selecting any one of the kinds of pairing methods.

In Step S5, pairing unit 25 transitions to a setting mode for pairing according to a pairing method selected in Step S4 according to the user operation. Pairing unit 25 completes, in Step S6, pairing with the plurality of devices 3a to 3c by sequentially sharing the respective pair keys with the plurality of devices 3a to 3c via communication unit 27 during the setting mode.

—Operations Performed by Devices 3—

Figure 5:
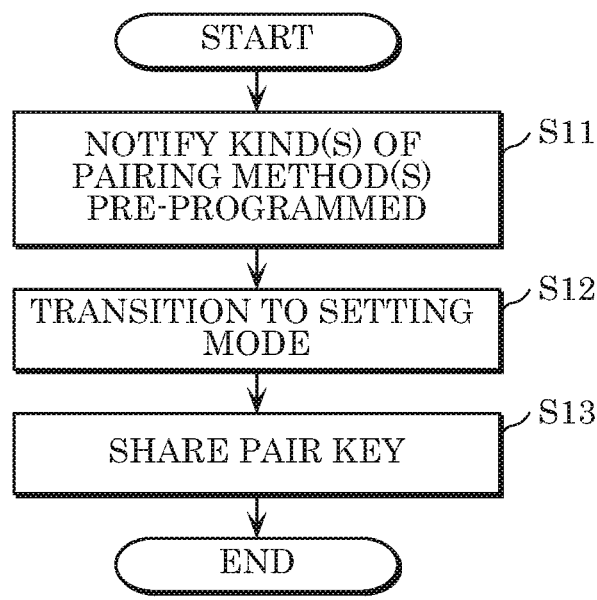
FIG. 5 is a flowchart for illustrating operations performed by the device included in the communication system according to the embodiment of the present invention.

Exemplary operations performed by devices 3 are described with reference to the flowchart in FIG. 5.

First, in Step S11, kind notifying unit 31 notifies the kind of pairing method pre-programmed in itself, in response to the inquiry from control apparatus 2.

In Step S12, pairing unit 32 transitions to a setting mode for pairing according to a pairing method selected in control apparatus 2 according to the user operation. In Step S13, pairing unit 32 completes, during the setting mode, pairing with control apparatus 2 by sharing the pair key with control apparatus 2 via communication unit 37.

Operations Performed by Communication System

Hereinafter, operations performed by a communication system according to an embodiment of the present invention are described.

Figure 6:
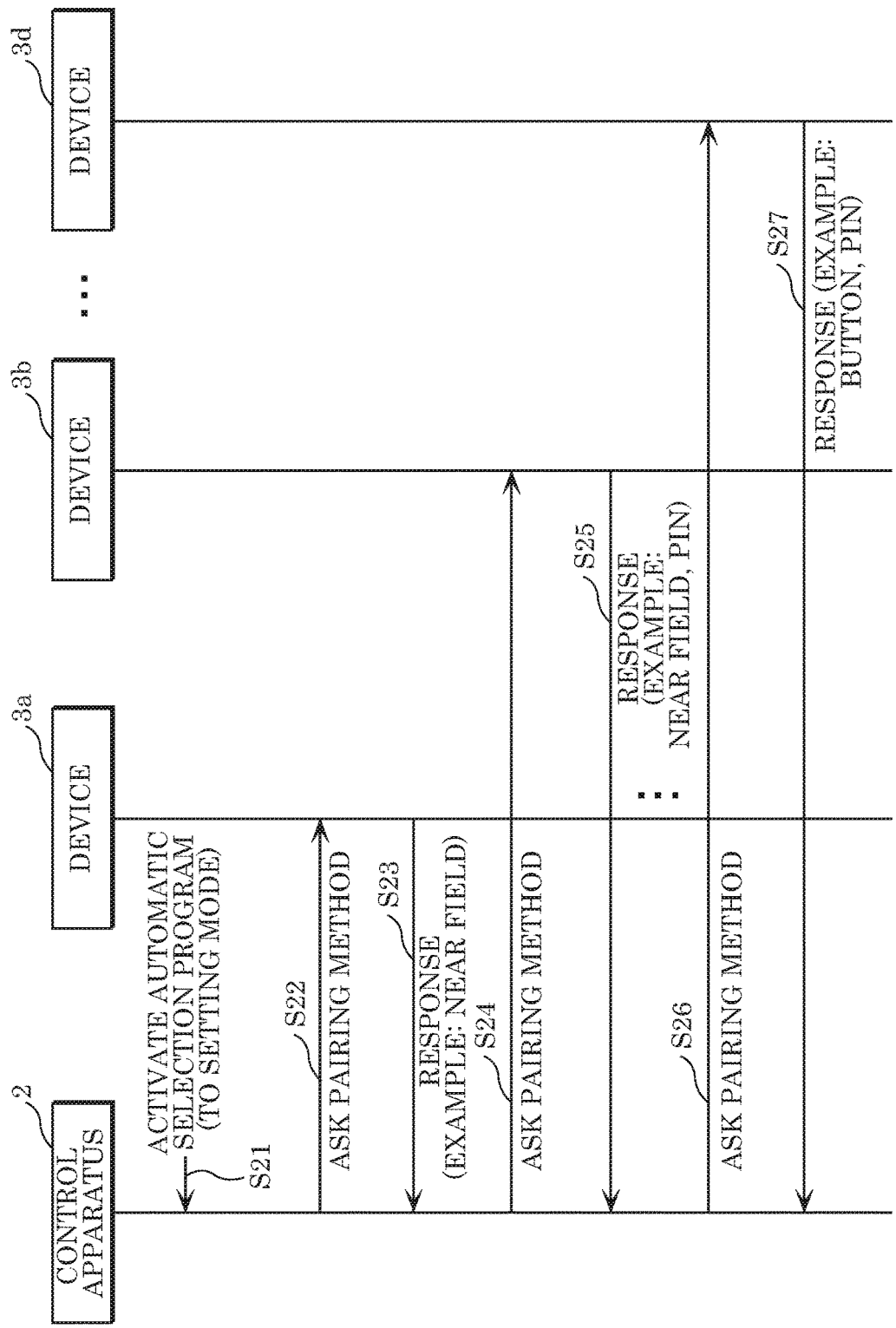
FIG. 6 is a sequence diagram for illustrating an operation example in the communication system according to the embodiment of the present invention.

First, with reference to the sequence diagram in FIG. 6, descriptions are given of how control apparatus 2 performs a method for presenting the combination of the kind of each of at least one pairing method among the kinds of pairing methods which have been respectively pre-programmed in the plurality of devices 3a to 3c in the communication system according to the embodiment of the present invention.

In Step S21, processing unit 20 in control apparatus 2 activates the setting support program (the "automatic selection program" in the diagram), in response to the user operation made onto input unit 28. Processing unit 20 searches the plurality of devices 3a to 3c connected with control apparatus 2 in a communicative manner.

In Step S22, kind obtaining unit 21 transmits a request signal for asking the kind of pairing method which has been pre-programmed in device 3a, to device 3a via communication unit 27. In Step S23, kind notifying unit 31 of device 3a notifies the kind of pairing method which has been pre-programmed in device 3a to control apparatus 2 via communication unit 37, in response that communication unit 37 received the request signal transmitted from control apparatus 2. For example, when device 3a has a pre-programmed function for pairing according only to a near field wireless communication (NFC) method, device 3a transmits a response indicating the NFC method to control apparatus 2 in Step S23.

In Step S24, kind obtaining unit 21 transmits a request signal for asking the kind of pairing method which has been pre-programmed in device 3b to device 3b via communication unit 27. In Step S25, kind notifying unit 31 of device 3b notifies the kind of pairing method which has been pre-programmed in device 3b to control apparatus 2 via communication unit 37, in response that communication unit 37 received the request signal transmitted from control apparatus 2. For example, when device 3b has a pre-programmed function for pairing according to the NFC method and the PIN code method, device 3b transmits a response indicating the NFC method and the PIN code method to control apparatus 2 in Step S23.

In Step S26, kind obtaining unit 21 transmits a request signal for asking the kind of pairing method which has been pre-programmed in device 3d to device 3d via communication unit 27. In Step S27, kind notifying unit 31 of device 3d notifies the kind of pairing method which has been pre-programmed in device 3d to control apparatus 2 via communication unit 37, in response that communication unit 37 received the request signal transmitted from control apparatus 2. For example, when device 3d has a pre-programmed function for pairing according to the push button method and the PIN code method, device 3d transmits a response indicating the push button method and the PIN code method to control apparatus 2 in Step S23.

As described above, kind obtaining unit 21 of control apparatus 2 obtains the kind of each pairing method for each of the plurality of devices 3a to 3d, based on the response from every one of devices 3a to 3d searched in Step S21.

Figure 7:
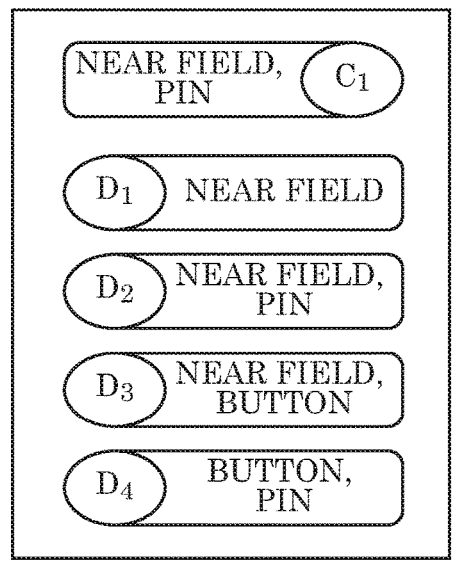
FIG. 7 is an example indicating the kinds of pairing methods of the control apparatus and a plurality of devices included in the communication system according to the embodiment of the present invention.

For example, it is assumed that, as illustrated in FIG. 7, control apparatus 2 has a pre-programmed function for pairing according to the NFC method and the PIN code method. In addition, it is assumed that kind obtaining unit 21 obtained the kinds of pairing methods which are: the NFC method for device 3a; the NFC method and the PIN code method for device 3b; the NFC method and the push button method for device 3c; and the push button method and the PIN code method for device 3d. It is to be noted that device name C1 denotes control apparatus 2, and device names D1 to D4 denote devices 3a to 3d, respectively.

In this case, combination determining unit 22 determines only the combination of the NFC methods for control apparatus 2 and device 3a. Combination determining unit 22 determines the combination of the NFC methods and the combination of the PIN code methods for control apparatus 2 and device 3b. Combination determining unit 22 determines only the combination of the NFC methods for control apparatus 2 and device 3c. Combination determining unit 22 determines only the combination of the PIN code methods for control apparatus 2 and device 3d.

Figure 8:
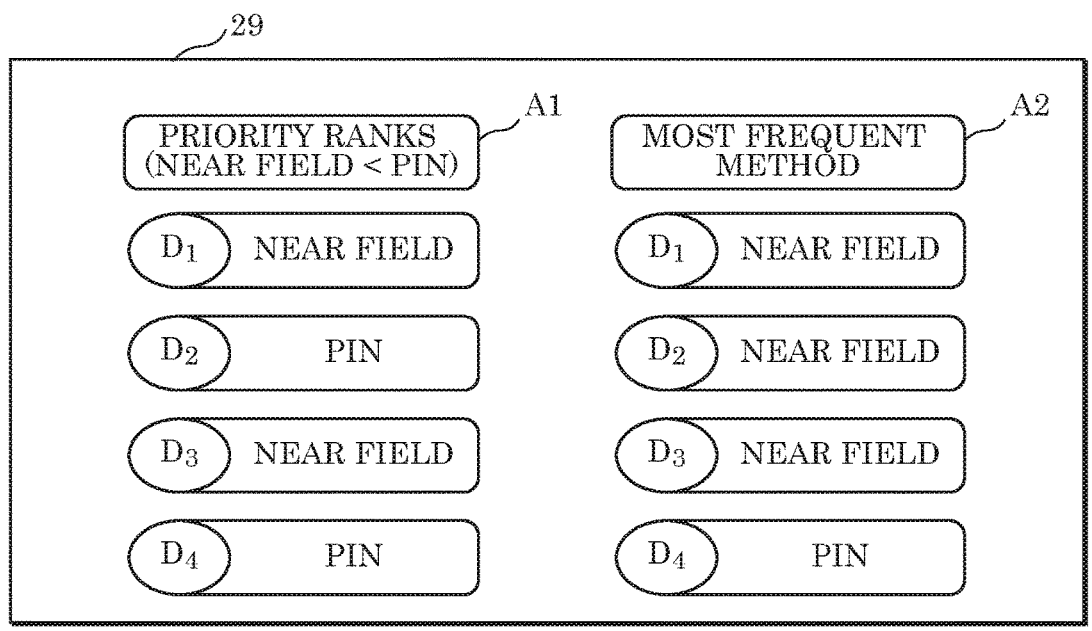
FIG. 8 is an example of a display screen displayed by a display unit of the control apparatus included in the communication system according to the embodiment of the present invention.

As illustrated in FIG. 8, presenting unit 23 selects, for each of the plurality of devices 3a to 3d, the combination from among the combinations of the kinds of pairing methods determined by combination determining unit 22, according to the predetermined conditions. In other words, in the example illustrated in FIG. 7, two combinations that are the combination of the NFC methods and the combination of the PIN code methods are determined by combination determining unit 22 for control apparatus 2 and device 3b, and presenting unit 23 selectively presents one of the two combinations according to the predetermined conditions for control apparatus 2 and device 3b.

For example, presenting unit 23 presents the combination of the kinds of pairing methods according to the priority ranks predetermined for the respective pairing methods. Assuming that the PIN code method is predetermined to have a priority rank higher than that of the NFC method, presenting unit 23 selectively presents the PIN code method in the combination for device 3b (D2).

In addition, presenting unit 23 may present the combinations of kinds of pairing methods, according to the numbers of respective kinds of pairing methods included in the combinations. In the example illustrated in FIG. 7, the NFC method is the most frequent method as being included in three of the combinations determined by combination determining unit 22, and the PIN code method is included in two of them. In this case, presenting unit 23 selectively presents the NFC method for device 3b (D2).

Alternatively, as illustrated in FIG. 8, presenting unit 23 may present each of the combinations of kinds of pairing methods, according to both of the priority ranks for the respective kinds and the numbers of respective kinds of pairing methods included in the combinations.

Simple-pairing setting unit 24 sets simple pairing with the plurality of devices 3a to 3d by causing part of pairing to be shared for each of the kinds of pairing methods presented by presenting unit 23.

Figure 9:
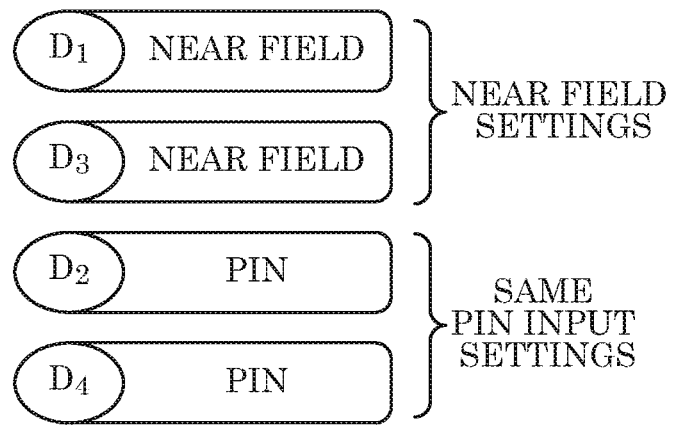
FIG. 9 is a diagram for illustrating operations performed by a simple-pairing setting unit of the control apparatus included in the communication system according to the embodiment of the present invention.

As illustrated in FIG. 9, regarding the combinations of kinds of pairing methods presented according to priority conditions, simple-pairing setting unit 24 sets part of pairing to be shared in the pairing with device 3a and device 3c according to the NFC method. More specifically, simple-pairing setting unit 24 makes settings so that pairing with respective devices 3a and 3c which approached control apparatus 2 are automatically and sequentially performed within a predetermined period of time from when a transition to the setting mode for expecting the approach of devices 3a and 3c was made. It is to be noted that "automatically" indicates that no explicit instruction from the user is received.

In addition, simple-pairing setting unit 24 sets one of the processes to be shared in the pairing with device 3b and device 3d according to the PIN code method. More specifically, simple-pairing setting unit 24 sets the same PIN code for device 3b and device 3d.

Figure 10:
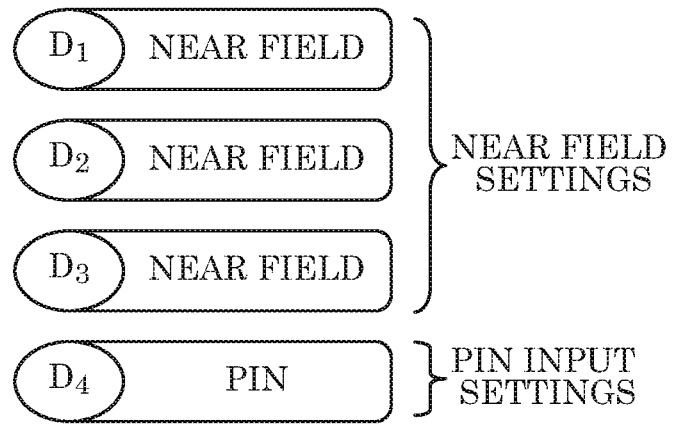
FIG. 10 is a diagram for illustrating operations performed by the simple-pairing setting unit of the control apparatus included in the communication system according to the embodiment of the present invention.

As illustrated in FIG. 10, simple-pairing setting unit 24 sets one of the processes to be shared for devices 3a to 3c, when the combinations of kinds of pairing methods are presented according to the conditions that are the numbers of respective kinds of pairing methods included in the combinations.

Simple-pairing setting unit 24 makes settings so that pairing with respective devices 3a to 3c which approach control apparatus 2 are automatically performed sequentially in a predetermined period of time from when a transition to the setting mode for expecting the approach of devices 3a to 3c was made.

As illustrated in FIG. 8 for example, presenting unit 23 presents the kinds of pairing methods to the user by means of display unit 29, so that the user can select any one of the kinds of pairing methods used as display conditions via input unit 28. In the example illustrated in FIG. 8, conditions regarding the priority ranks or the combinations are specified by means of area A1 or area A2 in input unit 28 that constitutes a touch panel display being operated.

In response to the operation indicating the transition to the setting mode made by the user onto input unit 28, pairing unit 25 transitions to the setting mode based on the conditions specified by input unit 28 and the settings set by simple-pairing setting unit 24.

Hereinafter, with reference to the sequence diagrams of FIG. 11 to FIG. 13, descriptions are given of examples of operations performed by control apparatus 2 and devices 3 in the case where control apparatus 2 and devices 3 perform pairing.

Figure 11:
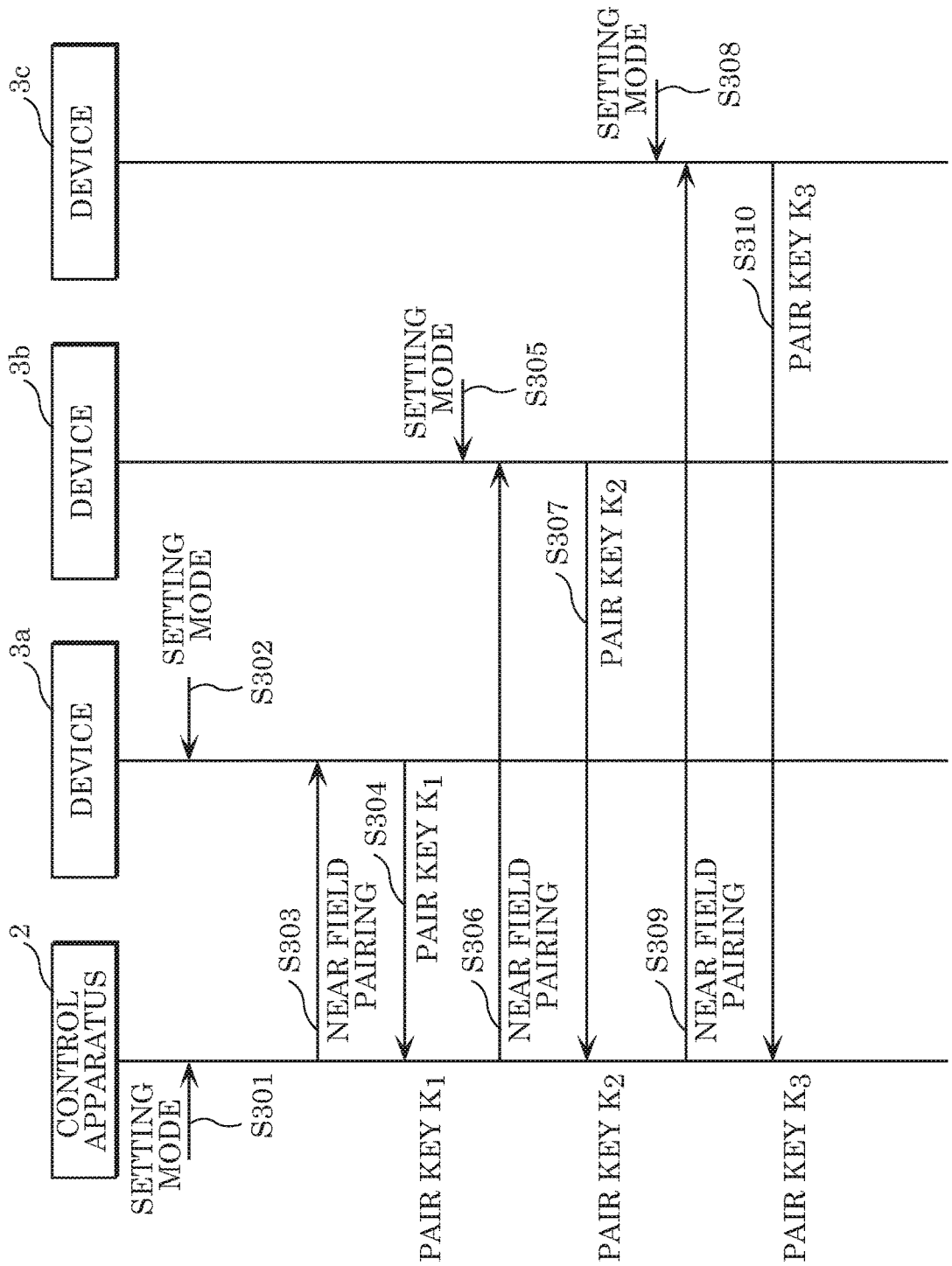
FIG. 11 is a sequence diagram for illustrating operations performed in the communication system according to the embodiment of the present invention.

First, with reference to the sequence diagram of FIG. 11, descriptions are given of operations performed in the case where it has been determined that the plurality of devices 3a to 3c perform pairing according to the NFC method based on the conditions specified by input unit 28 and the settings set by simple-pairing setting unit 24.

In Step S301, pairing unit 25 transitions to the setting mode for expecting the approach of devices 3a to 3c, in response to the user operation onto input unit 28. In Step S302, device 3a transitions to the setting mode for expecting the approach of control apparatus 2, in response to the user operation onto input unit 38.

In Step S303, control apparatus 2 and device 3a automatically start pairing when they approach relative to each other. In Step S304, control apparatus 2 and device 3a share pair key K1 which is a secret key.

In Step S305, device 3b transitions to the setting mode for expecting the approach of control apparatus 2, in response to the user operation onto input unit 38. In Step S306, control apparatus 2 and device 3b automatically start pairing when they approach relative to each other. In Step S307, control apparatus 2 and device 3b share pair key K2 which is a secret key.

In Step S308, device 3c transitions to the setting mode for expecting the approach of control apparatus 2, in response to the user operation onto input unit 38. In Step S309, control apparatus 2 and device 3c automatically start pairing when they approach relative to each other. In Step S310, control apparatus 2 and device 3c share pair key K3 which is a secret key.

As described above, control apparatus 2 makes settings for simple-pairing setting unit 24 so that pairing with approaching devices 3a to 3c are automatically performed sequentially in the single setting mode. In this way, control apparatus 2 can skip an operation for transitioning to a setting mode for each of the plurality of devices 3a to 3c. Thus, it is possible to increase userfriendliness in the plurality of pairing with devices 3a to 3c.

Figure 12:
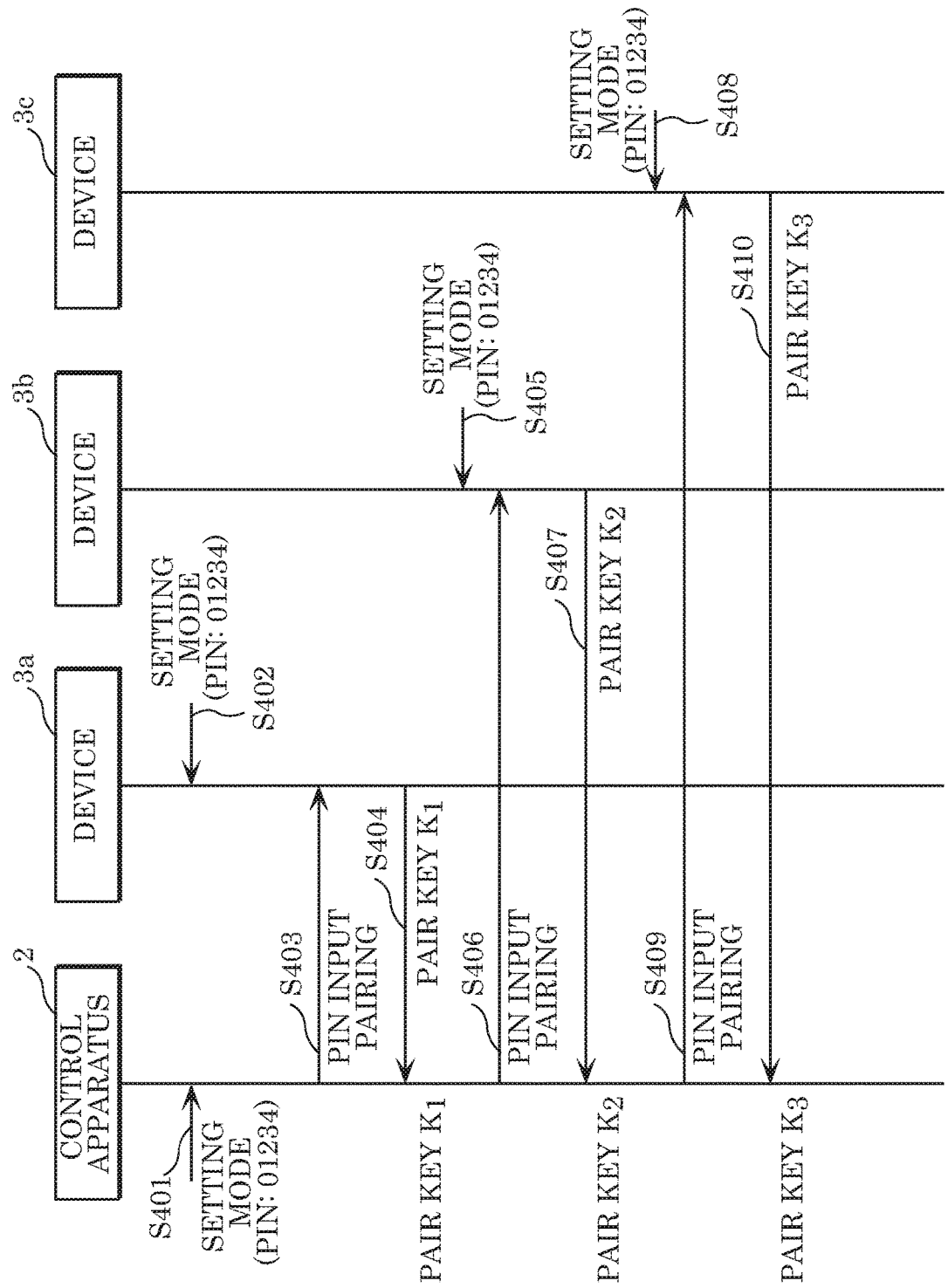
FIG. 12 is a diagram for illustrating operations performed in the communication system according to the embodiment of the present invention.

Next, with reference to the sequence diagram of FIG. 12, descriptions are given of operations performed in the case where it has been determined that the plurality of devices 3a to 3c perform pairing according to the PIN code method based on the conditions specified by input unit 28 and on the settings set by simple-pairing setting unit 24.

In Step S401, in response to the user operation onto input unit 28, pairing unit 25 transitions to the setting mode for expecting pairing with devices 3a to 3c in response to a user operation onto input unit 28, and receives input of a shared PIN code set by simple-pairing setting unit 24. In Step S402, device 3a transitions to the setting mode for expecting pairing with control apparatus 2, and receives input of the shared PIN code set by simple-pairing setting unit 24.

In Step S403, control apparatus 2 and device 3a automatically start pairing when the shared PIN code is input. In Step S404, control apparatus 2 and device 3a share pair key K1 which is a secret key.

In Step S405, in response to the user operation onto input unit 38, device 3b transitions to the setting mode for expecting pairing with control apparatus 2, and receives input of the shared PIN code set by simple-pairing setting unit 24. In Step S406, control apparatus 2 and device 3b automatically start pairing when the shared PIN code is input. In Step S407, control apparatus 2 and device 3b share pair key K2 which is a secret key.

In Step S408, in response to the user operation onto input unit 38, device 3c transitions to the setting mode for expecting pairing with control apparatus 2, and receives input of the shared PIN code set by simple-pairing setting unit 24. In Step S409, control apparatus 2 and device 3c automatically start pairing when the shared PIN code is input. In Step S410, control apparatus 2 and device 3c share pair key K3 which is a secret key.

As described above, control apparatus 2 makes settings for simple-pairing setting unit 24 so that paring with approaching devices 3a to 3c are automatically performed sequentially in the single setting mode. In this way, control apparatus 2 can skip an operation for transitioning to a setting mode for each of the plurality of devices 3a to 3c. Thus, it is possible to increase userfriendliness in the pairing with devices 3a to 3c.

Normally, the plurality of devices 3a to 3c are assigned with, for example, different PIN codes such as "01234", "23456", and "34567". In this case, different PIN codes need to be input for control apparatus 2 and the plurality of devices 3a to 3c, which is a large burden to the user. By means of control apparatus 2 and the plurality of devices 3a to 3c being assigned with the shared PIN code, the burden to the user is reduced.

Figure 13:
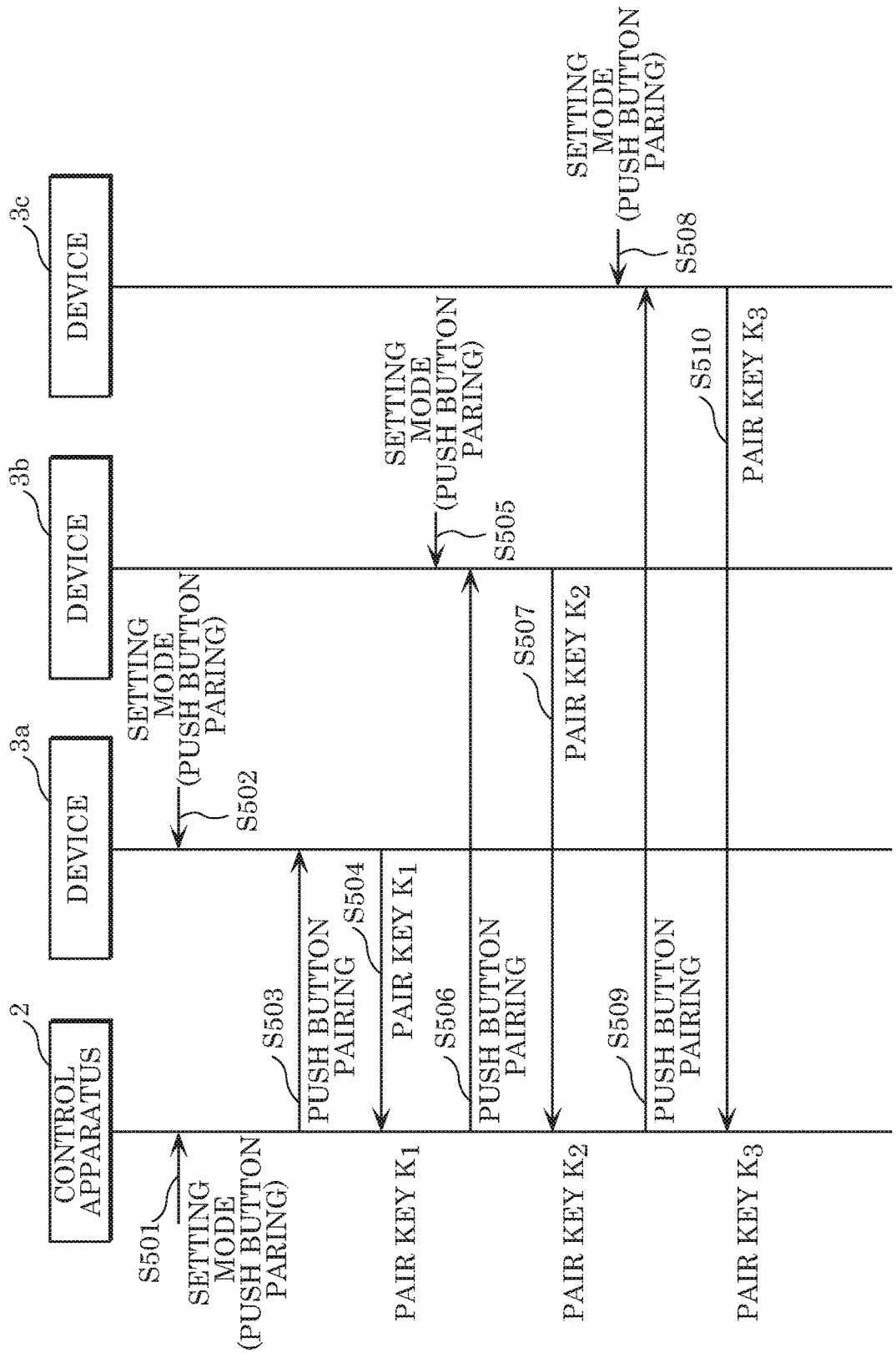
FIG. 13 is a diagram for illustrating operations performed in the communication system according to the embodiment of the present invention.

With reference to the sequence diagram in FIG. 13, descriptions are given of operations performed in the case where it has been determined that the plurality of devices 3a to 3c perform pairing according to the push button method based on conditions specified by input unit 28 and settings set by simple-pairing setting unit 24.

In Step S501, paring unit 25 transitions to the setting mode for expecting the pairing with devices 3a to 3c, in response to the user operation onto input unit 28 including buttons. In Step S502, device 3a transitions to the setting mode for expecting pairing with control apparatus 2, in response to the user operation onto input unit 38 including buttons.

In Step S503, control apparatus 2 and device 3a automatically start pairing when the specified buttons are respectively operated. In Step S504, control apparatus 2 and device 3a share pair key K1 which is a secret key.

In Step S505, device 3b transitions to the setting mode for expecting pairing with control apparatus 2, in response to the user operation onto input unit 38 including buttons. In Step S506, control apparatus 2 and device 3b automatically start pairing when the specified buttons are respectively operated. In Step S507, control apparatus 2 and device 3b share pair key K2 which is a secret key.

In Step S508, device 3c transitions to the setting mode for expecting pairing with control apparatus 2, in response to the user operation onto input unit 38 including buttons. In Step S509, control apparatus 2 and device 3c automatically start pairing when the specified buttons are respectively operated. In Step S510, control apparatus 2 and device 3c share pair key K3 which is a secret key.

As described above, control apparatus 2 makes settings for simple-pairing setting unit 24 so that paring with devices 3a to 3c which have been sequentially transitioned to the single setting mode is automatically performed. In this way, control apparatus 2 can skip an operation for transitioning to a setting mode for each of the plurality of devices 3a to 3c. Thus, it is possible to increase userfriendliness in the pairing with devices 3a to 3c.

With the communication system according to the embodiment of the present invention, it is possible to present, for each of the plurality of devices 3, a combination of the kinds of pairing methods performed by the plurality of devices 3 according to the kinds of pairing methods. Thus, it is possible to increase the userfriendliness in the pairing between control apparatus 2 and the plurality of devices 3.

In addition, with the communication system according to the embodiment of the present invention, it is possible to easily perform pairing with the plurality of devices 3 at approximately the same time by causing one of the processes to be shared for each of the kinds of pairing methods in the pairing with the plurality of devices 3. In this way, the communication system according to the embodiment of the present invention is capable of further increasing the userfriendliness in the pairing between control apparatus 2 and the plurality of devices 3.

Other Embodiments

The present invention has been described above based on the embodiment, the descriptions and drawings which constitute the present invention should not be interpreted as limiting the present invention. A person skilled in the art will appreciate various kinds of alternative embodiments, examples, and application techniques clearly based on the present disclosure.

For example, in the above-described embodiment, presenting unit 23 may present a specific operation to the user by means of display unit 29 in the pairing with device 3 according to the pairing method set by simple-pairing setting unit 24. For example, presenting unit 23 presents, by means of display unit 29, the following messages: "Please push buttons of devices having device names D1 to D4" when the plurality of devices 3 perform pairing according to the push button method; "Please approach devices having device names D1 to D4" when the plurality of devices 3 perform pairing according to the NFC method; or the like. In addition, presenting unit 23 may present, by means of display unit 29, the following message: "Please input PIN code 01234 to devices having device names D1 to D4" when the plurality of devices 3 perform pairing according to the PIN code method. In addition, in the above-described embodiment, the kinds or pairing methods may be kinds other than the push button method, the NFC method, and the PIN code method.

In addition, in the above-described embodiment, conditions that are employed by presenting unit 23 may include electric wave sensitivities of respective devices 3, in addition to the priority ranks and the numbers of respective kinds of pairing methods included in the combinations. For example, presenting unit 23 can set the condition that the priority ranks for the PIN code method and the push button method are set to be higher when the electric wave sensitivities of devices 3 are smaller. Conversely, presenting unit 23 can set the condition that the priority ranks for the NFC method are set to be higher when the electric wave sensitivities of devices 3 are larger.

As stated above, the present invention covers various kinds of embodiments etc. which are not described herein as a matter of course. Accordingly, the technical scope of the present invention should be defined based only on the invention-specifying matter according to the scope of the claims which are reasonable from the above descriptions.

The invention claimed is:

1. A communication system, comprising:
a control apparatus which controls pairing for determining whether a secret key can be shared with a communication partner according to a plurality of kinds of pairing methods; and
a plurality of devices each of which performs pairing for communication according to one or more predetermined kinds of pairing methods, and performs encryption communication with the control apparatus by pairing with the control apparatus,
wherein the control apparatus includes:
a kind obtaining unit configured to obtain, from each of the plurality of devices, the one or more predetermined kinds of pairing methods for the device;
a combination determining unit configured to determine, for each of the plurality of devices, a combination of a same kind of pairing methods included in both the plurality of kinds of pairing methods for the control apparatus and the one or more predetermined kinds of pairing methods obtained by the kind obtaining unit; and
a display unit configured to display, to a user, the combination of the same kind of pairing methods determined by the combination determining unit, for each of the plurality of devices according to a predetermined condition.

2. The communication system according to claim 1, wherein the display unit is configured to display, to the user, the combination of the same kind of pairing methods determined by the combination determining unit, according to a priority rank predetermined for each of the kinds of pairing methods.

3. The communication system according to claim 1, wherein the display unit is configured to display, to a user, the combination of the same kind of pairing methods determined by the combination determining unit, according to the numbers of respective kinds of pairing methods included in combinations of the kinds of pairing methods.

4. The communication system according to claim 1, wherein, in the pairing with the plurality of devices, the control unit is configured to cause part of pairing to be shared, for each of the kinds of pairing methods displayed by the display unit.

5. The communication system according to claim 1, wherein, in the pairing with at least two devices which are included in the plurality of devices and which perform pairing according to a push button method among the kinds of pairing methods included in the combinations displayed by the display unit, the control unit is configured to automatically and sedquentially perform pairing with the at least two devices for each of which a button was pushed within a predetermined period of time from when a button of the control apparatus was pushed.

6. The communication system according to claim 1, wherein, in the pairing with at least two devices which are included in the plurality of devices and which perform pairing according to a method using a personal identification number (PIN) code among the kinds of pairing methods included in the combinations displayed by the display unit, the control unit is configured to set a same PIN code to the at least two devices.

7. The communication system according to claim 1, wherein, in the pairing with at least two devices which are included in the plurality of devices and which perform pairing according to a near field wireless communication method among the kinds of pairing methods included in the combinations displayed by the display unit, the control unit is configured to automatically and sequentially perform pairing with the at least two devices which approached the control apparatus within a predetermined period of time from when the approach of the devices was started to be expected.

8. A control apparatus which controls pairing for determining whether a secret key can be shared with a communication partner according to a plurality of kinds of pairing methods, and controls encryption communication with a plurality of devices by pairing with the plurality of devices, each of the plurality of devices performing pairing for communication according to one or more predetermined kinds of pairing methods, the control apparatus comprising:
a kind obtaining unit configured to obtain, from each of the plurality of devices, the one or more predetermined kinds of pairing methods for the device;
a combination determining unit configured to determine, for each of the plurality of devices, a combination of a same kind of pairing methods included in both the plurality of kinds of pairing methods for the control apparatus and the one or more predetermined kinds of pairing methods obtained by the kind obtaining unit; and a display unit configured to display, to a user, the combination of the same kind of pairing methods determined by the combination determining unit, for each of the plurality of devices according to a predetermined condition.

9. The communication system according to claim 1, wherein the plurality of kinds of pairing methods include at least two of a push-button method, a method using a personal identification number, and a near field wireless communication method.

10. The communication system according to claim 1, wherein the combination of the same kind of pairing methods includes at least one of a push-button method, a method using a personal identification number, and a near field wireless communication method.

* * * * *